May 20, 1969 A. JONES 3,445,829
MAGNETIC INFORMATION STORAGE MATRICES
Filed April 14, 1965
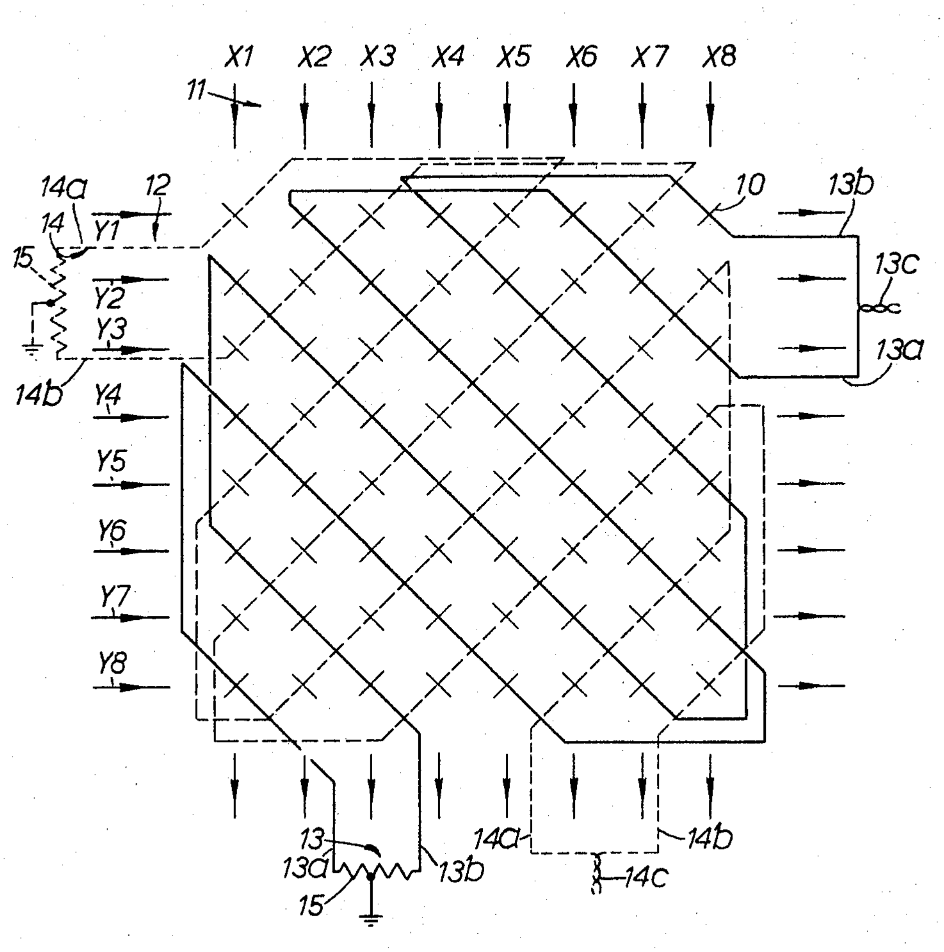

United States Patent Office 3,445,829

Patented May 20, 1969

3,445,829

MAGNETIC INFORMATION STORAGE MATRICES

Alan Jones, Harpole, England, assignor to Plessey-UK Limited, Ilford, England, a British company Filed Apr. 14, 1965, Ser. No. 448,584
Claims priority, application Great Britain, Apr. 15, 1964, 15,517/64
Int. Cl. G11b *5/00*
U.S. Cl. 340—174 6 Claims

ABSTRACT OF THE DISCLOSURE

A magnetic information storage matrix having two sense wires, each wire forming a parallel-pair transmission line, one sense wire threading all cores located at the intersection of two odd or two even numbered address wires, the other sense wire threading all cores situated at the intersection of one odd and one even numbered address wire.

This invention relates to magnetic information storage matrices capable of operating in the coincident-current mode for element selection, and is concerned with the arrangement of the "read" or "sense" conductor in such matrices.

The sense wire in a coincident current matrix enables the state of the selected core to be determined by the nature of the output pulse delivered by the core when interrogated by coinciding pulses on the address wires threading it. Since the sense wire threads a large number of cores the true response from the selected core is liable to be masked by spurious responses produced in the sense wire as the result, for example, of inductive or capacitative coupling with the address wires. This effect is cumulative and in a large matrix these spurious responses may, unless special precautions are taken, exceed by a considerable factor the wanted output pulse of a selected core.

According to a feature of the invention, a plane of a magnetic information storage matrix includes two sense wires, one threading all cores located at the intersection of two odd or two even numbered address wires, and the other sense wire threading all cores situated at the intersection of one odd and one even numbered address wire, each sense wire being formed as a parallel-pair transmission line each conductor of which links the same number of cores. This arrangement leads to a configuration in which the sense wires pass diagonally from edge to edge of the matrix plane.

The two sense wires may be independently terminated and deliver independent output pulses, or may be connected in series to form a common sense conductor.

Other features of the invention will be evident in the following description of a memory matrix plane configuration embodying a preferred form of the invention. The description refers to the accompanying drawing which shows with conventional symbolism the arrangement of the matrix cores and conductors.

The drawing shows a storage matrix plane consisting of 64 angular storage cores of square-loop ferrite material shown conventionally as at 10. The rows and columns of the matrix contain equal numbers of cores and are threaded by sets of X and Y drive wires 11 and 12 respectively; for clarity only the terminal portions of the drive wires are shown. Each core 10 is also threaded by one or other of two sense wires 13 and 14, which between them thread every core in the matrix.

Since this invention is concerned with the configuration of the sense wires 13 and 14, only these wires are shown in full in the drawing, the intermediate portions of the X and Y drive wires 11 and 12 and other wires such as inhibit wires that may be present in a practical matrix arrangement being omitted.

The two sense conductors 13 and 14 thread equal numbers of storage cores. Sense conductor 13, shown in a full line in the drawing, threads all the cores that lie at the intersection of an odd numbered and an even numbered drive wire, while the sense conductor 14 shown with a broken line threads the cores situated at the intersection either of two odd numbered or of two even numbered drive wires. Thus in each column or row of the plane the two sense conductors thread alternate cores.

The sense conductor 13 consists of two lengths of wire 13*a* and 13*b* respectively which traverse the matrix plane in diagonal edge-to-edge passes, maintaining a constant spacing between them of one core space in the diagonal direction, so that the two wires 13*a* and 13*b* together approximate to a parallel-pair transmission line threading the matrix. Each wire 13*a* or 13*b* of the line threads the same number of storage cores. At one end the transmission line formed by the two wires 13*a* and 13*b* is short-circuited, the two wires being joined together at 13*c*, while at the other end the line is terminated by a load resistance 15 which has a centre-tapped connection to earth.

The second sense wire 14 is formed in the same way of two wires 14*a* and 14*b* forming a parallel-pair transmission line threading the matrix along the opposite diagonal to that threaded by sense wire 13.

The output voltages of the sense conductors developed across the centre-tapped resistors 15 are amplified in a differential amplifier which does not respond to equal excursions of the two wires 13*a* and 13*b* from earth potential.

In any storage plane operating by coincident-current element selection spurious output pulses can be generated in the sense conductors by so-called core noise or delta noise, or by stray inductive or capacitative coupling between the pulsed address wires and the sense conductors. These factors will be briefly considered in relation to the configuration shown in the drawing.

If a core, for example the core (X1, Y1) in the drawing, is to be interrogated by applying "half-read" pulses to the corresponding drive conductors X1 and Y1, all the other cores in column X1 and row Y1 will be subjected to a single half-read pulse. For sense conductor 13 the cores in column X1 which it threads may be considered as self-cancelling pairs (X1, Y2) and (X1, Y6), and (X1, Y4) and (X1, Y8), the wires of the sense conductor 13 threading the cores of the pairs in opposite directions and thus having oppositely-directed spurious outputs induced in them. The outputs due to the half-read impulses applied to the cores in column X1 therefore cancel in conductor 13. The same argument applies to the outputs induced in conductor 13 by the disturbance of the cores in row Y1. Cancellation of the half-read outputs would be complete if the individual half-read outputs from each core were of equal amplitudes. This may not be the case in practice, since the amplitude of the half-read response depends partly on the individual core characteristics, more or less closely controlled in production, and partly on the immediately-previous magnetic history of the individual core. If a single sense wire threads every core in the matrix, the cumulative spurious output in the sense wire may for certain patterns of stored information in the plane exceed by a considerable factor the amplitude of the wanted output pulse from the selected core, thus masking the true output of the interrogation process and introducing ambiguities or errors in the plane response. By sub-dividing the sense wire into two individually-terminated sense conductors the cumulative spurious response is halved and can be kept to a level that permits adequate discrimination of the wanted output pulse.

If the same argument is applied to the sense conductor 14 which threads the core selected by the interrogation process, it will be seen that perfect cancellation of spurious outputs is in any event impossible since the spurious outputs from the remaining cores of the selected row and column can no longer be grouped into self-cancelling pairs. This factor is inherent in the coincident-current method of selection but in a large matrix the resulting spurious output, being effectively that of a single core in the column and in the row, is small compared with the cumulative outputs from the remaining cores linked by the sense wire.

Direct inductive coupling occurs at each intersection of a drive conductor and a sense conductor. With the plane configuration shown in the drawing it will be seen that each sense conductor links inductively with any one drive conductor four times, two in one sense and two in the opposite sense, so that the inductively-induced spurious outputs in the sense wire tend to cancel.

Capacitative coupling exists between the sense wires and the drive wires, localised mainly at the cross-over points within the cores. Thus when a drive conductor such as X1 is pulsed its potential changes and a displacement current is produced in the corresponding sense conductors. The same mechanism of mutual cancellation occurs for this capacitative displacement current as for the inductively-induced spurious responses considered above. The displacement currents in the wires **13*a* and 13*b* produce equal and opposite potential excursions of the ends of the terminating resistors such as 15, these excursions cancelling in the differential amplifier and producing no output. However for perfect cancellation of these potentials not only the amplitudes of the induced pulses but also the instance at which they appear across the two halves of the load resistor 15 must coincide. Thus the propagation times from the points at which the capacitative coupling with the drive wire occurs to the terminating resistor 15 must so far as possible be equal for cancelling pairs of pulses. The arrangement shown in the drawing approaches this desired arrangement, since the maximum discrepancy in the propagation path lengths between the load resistor 15 and the points at which the two sense wires of the sense conductor thread the two cores of a cancelling pair does not by more than one core space. The cancellation process is further assisted by the fact that the current paths to the load resistor 15** are parallel throughout the matrix and approximate to a parallel-line feeder. It will be noted that every pass of a sense wire runs from edge-to-edge of the matrix and passes through each core during this pass in the same angular relationship with the core. The weaving of the sense conductors is thus a simple process. In this respect the arrangement shown in the drawing is greatly superior to matrix planes in which the sense wire configuration to achieve low noise output on the sense wires has involved such measures as the transposition of a pair of parallel sense wires at an intermediate point in a pass through the plane. Planes embodying these alternative configurations have proved impossible to construct with the smaller size of storage core in current use without incurring a very high failure rate in production.

It will be noted that the use of a pair of sense wires implies that when a particular core is selected means must also be employed to select the output from the appropriate sense wire. In the arrangement shown one sense wire threads all the cores lying at the intersection of an odd and an even address wire, while the other sense wire threads all the cores lying at the intersections of either two odd or two even address wires. If as is normal the address information is presented to the store in binary form, a simple gating circuit controlled by the least significant digits of the X and Y address information can be employed to select the output from the appropriate sense conductor.

What I claim is:

1. A magnetic information storage matrix a plane of which includes two sense wires, one threading all cores located at the intersection of two odd or two even numbered address wires, and the other sense wire threading all cores situated at the intersection of one odd and one even numbered address wire, each sense wire being formed as a parallel-pair transmission line each conductor of which links the same number of cores so that the sense wires pass diagonally from edge-to-edge of the matrix plane.

2. A magnetic information storage matrix as claimed in claim 1, in which the two sense wires are independently terminated and deliver independent output pulses.

3. A magnetic information storage matrix as claimed in claim 1, in which the two parallel conductors are connected in series to form a common sense wire.

4. A magnetic information storage matrix as claimed in claim 1, in which one or both of the said conductors comprises two lengths of wire which traverse the matrix plane in diagonal edge-to-edge passes with constant spacing of one core space being provided in the diagonal direction.

5. A magnetic information storage matrix as claimed in claim 4, in which the two wires forming each sense wire are short circuited at one end and have a load resistance terminating the other end with an earthed centre tap connection being afforded on the load resistance.

6. A magnetic information storage matrix arrangement as claimed in claim 4, in which the outputs of the sense wires taken from across the load resistance are applied to a differential amplifier.

References Cited

UNITED STATES PATENTS

| | | | |
|---|---|---|---|
| 3,012,231 | 12/1961 | Kent | 340—174 |
| 2,985,948 | 5/1961 | Peters. | |
| 3,058,096 | 10/1962 | Humphrey et al. | |
| 3,142,049 | 7/1964 | Crawford | 340—174 |

STANLEY M. URYNOWICZ, JR., *Primary Examiner.*